US009486870B2

(12) United States Patent
Bienvenu et al.

(10) Patent No.: US 9,486,870 B2
(45) Date of Patent: Nov. 8, 2016

(54) METHOD FOR MANUFACTURING A METAL PART

(71) Applicant: AIRCELLE, Gonfreville L'Orcher (FR)

(72) Inventors: Philippe Bienvenu, Montivilliers (FR); Jean-Claude Rivoal, Gruchet-la-Valasse (FR); Flavien Poulet, Montivilliers (FR); Francisco Caneque, Evreux (FR)

(73) Assignee: AIRCELLE, Gonfreville l'Orcher ( * ) Notice: Subject to any disclaimer, the term of this patent is extended or adjusted under 35 U.S.C. 154(b) by 0 days.

(21) Appl. No.: 14/609,726

(22) Filed: Jan. 30, 2015

(65) Prior Publication Data

US 2015/0136841 A1    May 21, 2015

Related U.S. Application Data

(63) Continuation of application No. PCT/FR2013/051860, filed on Aug. 1, 2013.

(30) Foreign Application Priority Data

Aug. 2, 2012 (FR) ...................... 12 57530

(51) Int. Cl.
| | |
|---|---|
| *B23K 1/00* | (2006.01) |
| *B23K 1/008* | (2006.01) |
| *B23K 3/08* | (2006.01) |
| *B23K 1/20* | (2006.01) |
| *F01D 25/00* | (2006.01) |

(52) U.S. Cl.
CPC ............. *B23K 1/0018* (2013.01); *B23K 1/008* (2013.01); *B23K 1/20* (2013.01); *B23K 3/087* (2013.01); *F01D 25/005* (2013.01); *B23K 2001/12* (2013.01)

(58) Field of Classification Search
CPC .................................................. B23K 1/0018
See application file for complete search history.

(56) References Cited

U.S. PATENT DOCUMENTS 4,889,276 A * 12/1989 Cadwell ................. B23K 20/00
                                                                    219/385
5,205,470 A *  4/1993 Cadwell .............. B21D 26/055
                                                                    228/18

(Continued)

FOREIGN PATENT DOCUMENTS

| DE | WO 03092946 A1 * | 11/2003 | ........... B23K 1/0012 |
|---|---|---|---|
| WO | 03/092946 A1 | 11/2003 | |
| WO | 2010/007263 A1 | 1/2010 | |

OTHER PUBLICATIONS

International Search Report issued Nov. 26, 2013 in International Application No. PCT/FR2013/051860.

*Primary Examiner* — Devang R Patel
(74) *Attorney, Agent, or Firm* — Burris Law, PLLC

(57) ABSTRACT

A manufacturing method for a metal part uses a tooling assembly. The tooling assembly includes a counter-form and a deformable core which includes inner and outer skins, a honeycomb structure positioned between the inner and outer skins, and a brazing material interposed between the honeycomb structure and the inner and outer skins. In particular, the core is closed by a lid equipped with ducts through which a gas is introduced. The manufacturing method includes the following steps: positioning the tooling assembly in a vacuum furnace; introducing a pressurized gas directly inside an inner skin of the core of the tooling assembly; purging the pressurized gas from an inner portion of the inner skin of the tooling assembly; and dismounting the tooling assembly so as to extract a metal part manufactured.

10 Claims, 5 Drawing Sheets

(56) References Cited

U.S. PATENT DOCUMENTS 6,914,225 B2 * 7/2005 Fischer ............ A61K 47/48215
219/634

2009/0049794 A1 * 2/2009 Barone ................ B23K 1/0012
52/745.21
2011/0274551 A1 * 11/2011 Iwasaki ................ B21D 26/049
416/224

* cited by examiner

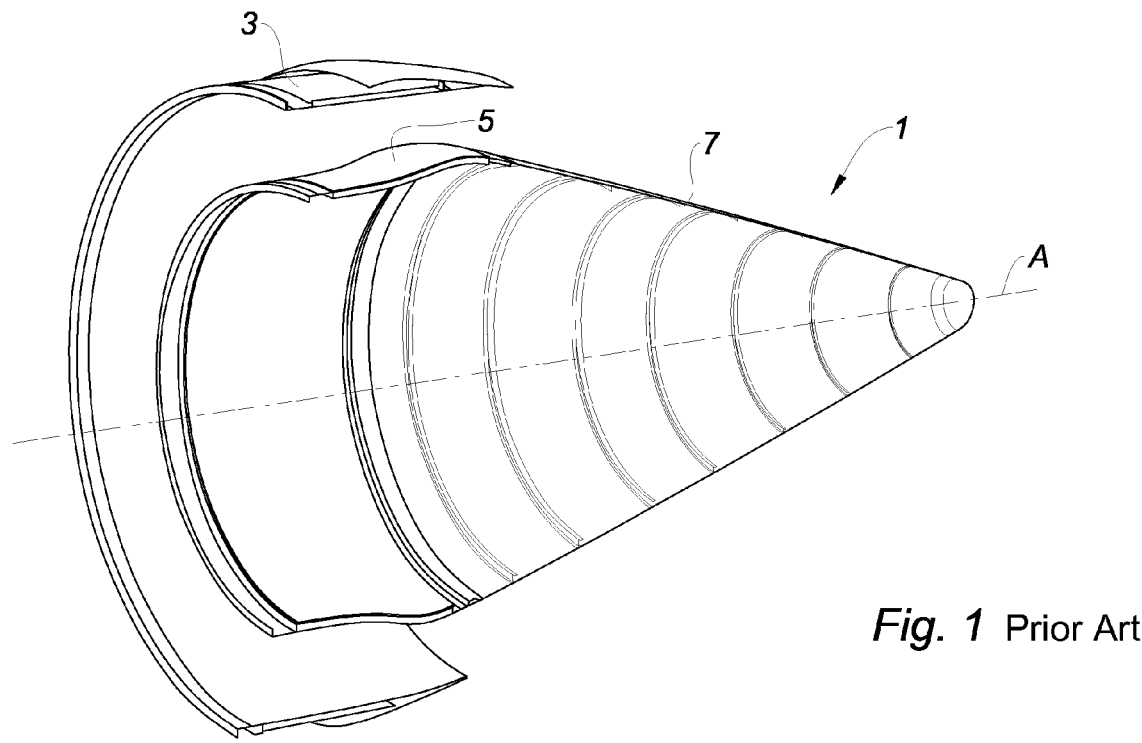
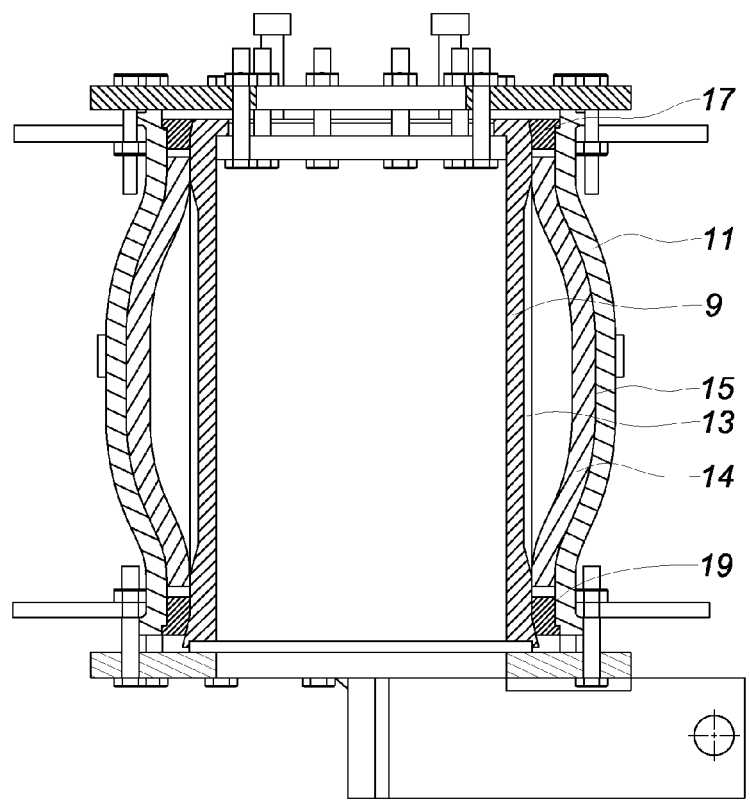
Fig. 1 Prior Art
Fig. 2 Prior Art

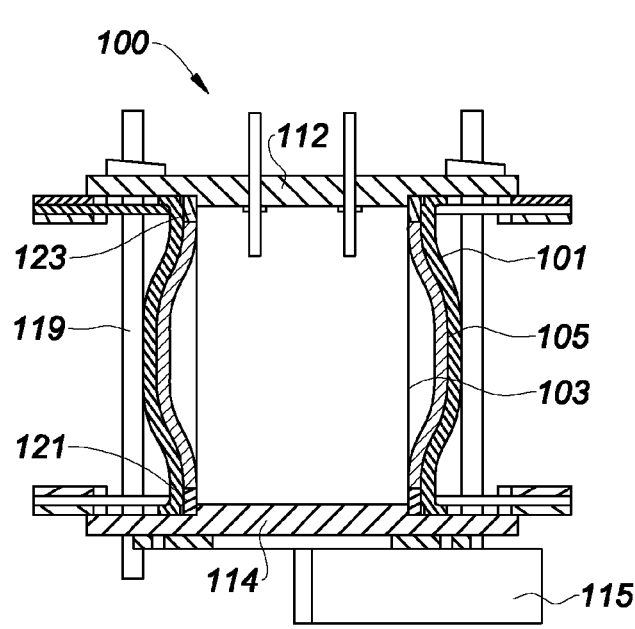
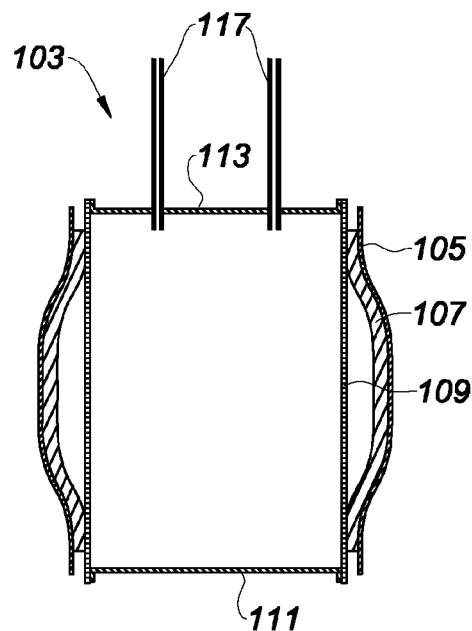
Fig. 3
Fig. 4
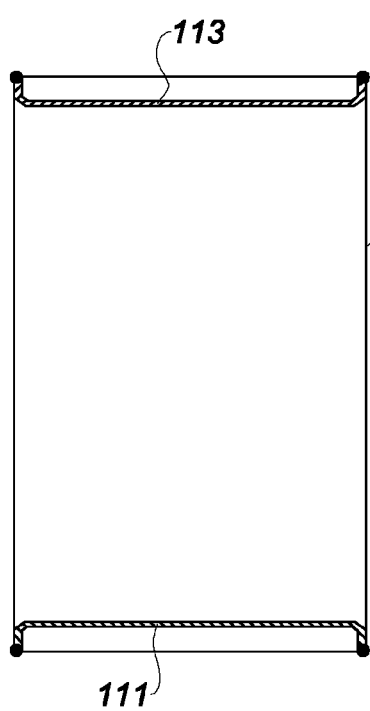
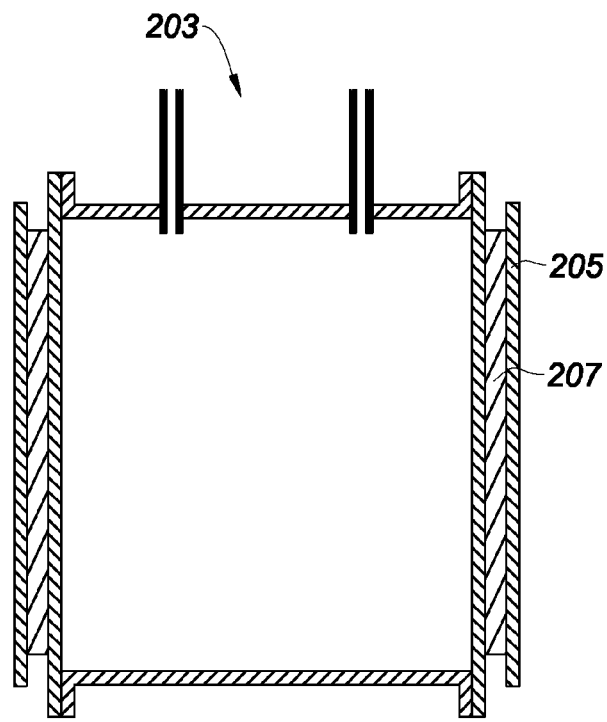
Fig. 5
Fig. 6

METHOD FOR MANUFACTURING A METAL PART

CROSS-REFERENCE TO RELATED APPLICATIONS

This application is a continuation of International Application No. PCT/FR2013/051860, filed on Aug. 1, 2013, which claims the benefit of FR 12/57530, filed on Aug. 2, 2012. The disclosures of the above applications are incorporated herein by reference.

FIELD

The present disclosure relates to a method for manufacturing a metal part.

BACKGROUND

The statements in this section merely provide background information related to the present disclosure and may not constitute prior art.

Brazing is a technique of assembling two materials which is based on the differentials of the thermal expansion coefficients of the tooling and of the material of the part to be brazed.

In practice, the brazing is carried out thanks to an assembly of metal tooling supporting the parts to be assembled. A filler metal having a melting temperature lower than that of the materials to be assembled, for example, of tin, copper, silver, aluminum, nickel or even precious metal alloys, is interposed between the two components to be assembled, then the assembly is heated at a temperature allowing the melting of the filler metal but not that of the components to be assembled. The liquefied filler metal wets the surfaces of the two components to be assembled. Under the effect of this rise in temperature, the expansion of the tooling provides a plating between the parts to be assembled.

The assembly is then cooled so as to solidify the filler metal between the two components to provide the connection.

Such a method is described for example in the international application WO 2003/092946, which targets a welding diffusion method.

As an indication, the mass of a tooling for a part of 1.2 meters of diameter and 0.6 meters of height is in the range of 1.4 tons, which requires in practice a cycle time, for heating and cooling the assembly, in the range of 13 hours.

If such a brazing method is absolutely applicable and advantageous to assemble together small-sized titanium parts, it does not hold true when the part to be manufactured is large-sized.

This is in particular the case when the part to be manufactured is a fixed inner structure of turbojet engine nacelle.

An aircraft is driven by several turbojet engines each housed in a nacelle. The nacelle has generally a tubular structure comprising an upstream air inlet of the turbojet engine, a middle section intended to surround a fan of the turbojet engine, a downstream section hosting the thrust reversal means and intended to surround the combustion chamber of the turbojet engine and, generally ended by an ejection nozzle located downstream of the turbojet engine.

The downstream section of a nacelle generally comprises an outer structure, called Outer Fixed Structure (OFS), which defines, with a concentric inner fixed structure, called Inner Fixed Structure (IFS), surrounding the engine structure itself downstream of the fan, an annular flow channel, channel also called flow path and intended to channel the cold air flow which circulates outside the engine.

An inner fixed structure of thrust reverser may have a diameter of 2.4 meters and a height of 2.7 meters. The metal tooling implemented to manufacture such a part by the brazing method as previously defined has a mass of 4.6 tons, which generates a very high thermal inertia making the brazing difficult. In addition, the cycle time for heating then for cooling the assembly with such a metal tooling is very long, in the range of 20 hours.

Furthermore, regardless of the size of the part to be manufactured, such a method is not adapted for the manufacture of a part whose the parts to be assembled have a very high coefficient of thermal expansion, for example the Inconel 625, material that can typically be used to manufacture the front portion of the ejection cone of hot gases from the turbojet engine.

It should in general be provided an ejection cone at the rear of an aircraft turbojet engine, in order to optimize the flow of the hot gases discharged by the turbojet engine on the one hand, and to absorb at least a portion of the noise generated by the interaction of these hot gases with the ambient air and with the cold air flow discharged by the turbojet engine fan on the other hand.

Such a conventional ejection cone 1 is shown in FIG. 1, in which the upstream and the downstream (relative to the flow direction of the exhaust gases of the turbojet engine) are respectively located on the left and on the right of the figure). This cone is intended to be positioned downstream of the turbine of the turbojet engine, concentrically to a shroud, or nozzle 3, itself fixed on the downstream edge of the combustion chamber of the turbojet engine. More specifically, the ejection cone 1 comprises, strictly speaking, a front portion of the cone 5 (often designated by "front plug"), of substantially cylindrical shape, and a rear portion of the cone 7 (often designated by "rear plug"), of conical shape.

These two portions of the ejection cone can typically be formed by metal alloy plates of Inconel 625 or titanium B21s type.

The front portion 5 can be particularly acoustic or monolithic stiffened. In the case where the front portion 5 is monolithic stiffened, this means that the structure is constituted of a unique plate reinforced with stiffeners. In the case where the front portion 5 is acoustic, it comprises at least one peripheral acoustic attenuation structure of sandwich type comprising at least one resonator, particularly of honeycomb type, covered with a perforated outer skin and with a full inner skin. The outer skin also constitutes an outer surface (plate) of the front portion of the cone 5.

The filler metals capable of being used for brazing parts made of Inconel have a relatively high cost.

To overcome this drawback, it is known from the prior art a brazing tooling by gas pressurization, tooling shown in FIG. 2, particularly allowing the brazing of the Inconel 625.

According to this prior art, the tooling comprises a central cylindrical cask 9 comprising at its periphery an outlet orifice (not shown), and a counter-form 11 having a shape substantially similar to the part to be manufactured. Typically, the counter-form is in two portions in order to be subsequently withdrawn when the part to be manufactured has a shape that cannot be removed from the mold.

An inner skin 13 of cylindrical shape, a honeycomb structure 14, then an outer skin 15 are placed between the central cask 9 and the counter-form 11.

Brazing sheets were interposed beforehand between each element constituting the inner skin/honeycomb structure/outer skin assembly.

The outer skin 15 is perforated and preformed (operation carried out first), that is to say of a shape substantially corresponding to the final shape which is desired to be given to the part, for example a domed shape as shown in FIG. 1.

The tooling further comprises at its upper and lower ends of the sealing flanges 17 and 19, intended to seal the tooling. These flanges are fixed to the central cask 9 by screwing.

The brazing method by gas pressurization consists of placing the tooling assembly in a vacuum furnace, and then introducing a gas, for example the argon, inside the central cask 9, diffusing through an outlet orifice of the central cask inside the inner skin 13.

An increasing in the furnace temperature causes the expansion of the gas, and therefore the deformation of the inner skin 13 and of the honeycomb structure, deforming until coming across the outer preformed skin 15, then until encountering the counter-form 11.

By increasing more the temperature, the brazing sheets melt and hold together the elements constituting the manufactured metal part during cooling.

The tooling assembly may then be dismounted by unscrewing the upper and lower sealing flanges, and by releasing the portions constituting the counter-form.

A major drawback of this type of tooling is that the sealing system is unreliable. The screws which allow the clamping of the flanges on the central cask 9 expand under the effect of pressure, which causes a decrease in the pressure on the sealing system causing leakages in the vacuum furnace.

In addition, the mounting and the dismounting of the sealing system are relatively complex, and the sealing time of the tooling is very long, which could go up to several hours.

Attempts were made to solve these problems by covering the screws of the flanges by a cover made of stainless steel, positioned above the tooling so as to allow a thermal protection of said screws.

However, despite the use of such protection covers, the screws of the sealing flanges expand again strongly, and this sealing system is not satisfactory.

SUMMARY

The present disclosure provides a method for manufacturing a metal part, the method comprising the following steps:

positioning a tooling assembly in a vacuum furnace, wherein the tooling assembly comprises: at least one counter-form of a shape substantially similar to that of said part to be manufactured; and at least one tight core deformable at least partially, wherein the tight core comprises: at least one inner skin and at least one outer skin, said inner and outer skins respectively constituting an inner skin and an outer skin of the part to be manufactured; at least one honeycomb structure positioned between said inner and outer skins; and at least one brazing element, interposed between the honeycomb structure and said inner and outer skins, said core being closed at its ends by at least one tight lid comprising means for introducing a gas inside said core, at least one of said lids being fixed to said inner skin by welding;

introducing a pressurized gas directly inside the inner skin of the core of the tooling assembly;

heating the tooling assembly so as to cause successively: the plating of the core against the counter-form by expansion of said pressurized gas; and the brazing of the honeycomb structure and of the inner and outer skins;

purging said gas from the inner portion of the inner skin; and dismounting the tooling assembly so as to extract the manufactured part.

Thus, by welding a lid to the ends of the inner skin of the tooling assembly, said assembly is perfectly tight during the introduction of a gas inside said core. In addition, thanks to the fixing of the lid by welding on the inner skin of the core of the tooling assembly, the assembling method of said assembly is facilitated relative to the assembling method of the tooling assemblies known from the prior art. Thus, the assembling time and the sealing time of the assembly are significantly reduced.

Furthermore, by equipping the core by at least one inner skin constituting an inner skin of the part to be manufactured, the introduction of gas is directly made inside the inner skin, and the presence of a cask enclosing the gas to be diffused is not necessary.

Consequently, the mass of the tooling is significantly reduced relative to that obtained in the prior art to implement a brazing method by differential expansion, which advantageously allows to reduce the thermal inertia.

Moreover, the counter-form used in the method according to the present disclosure is not necessarily of metal, as opposed to the counter-forms used in the prior art to implement brazing methods by differential expansion, which allows limiting the thermal inertia generated by the tooling assembly.

Thus, by reducing the thermal inertia in that way, the thermal cycle is also ultimately reduced, and consequently the duration of manufacturing a metal part of large size such as an inner fixed structure of a nacelle is improved relative to the known methods of the prior art.

The method according to the present disclosure can be used to manufacture a front portion of the ejection cone of hot gases discharged by an aircraft turbojet engine, whose inner and outer skins are preferably made of Inconel 625.

According to other feature of the manufacturing method of the front portion of the ejection cone of the hot gases discharged by an aircraft turbojet engine, the inner skin is cold-formed by hydro-forming, which advantageously allows limiting the deformations of the honeycomb structure during the introduction of pressurized gas and the temperature elevation.

In one form, the inner skin of the ejection cone is of substantially cylindrical shape.

According to a first form, the outer skin is preformed.

According to a second form, the outer skin is of substantially cylindrical shape, which allows simplifying the parts constituting the core of the tooling assembly in that it is not necessary to preform said outer skin before its setting up in the tooling assembly.

Furthermore, the outer skin is an acoustic skin, that is to say, it is pierced, for example by a water jet.

The manufacturing method according to the present disclosure can also be used to manufacture an inner fixed structure of turbojet engine nacelle, whose inner and outer skins are preferably made of titanium.

For the manufacture of an inner fixed structure of a turbojet engine nacelle, the method for manufacturing the tooling assembly is made by the method comprising the following steps:

manufacturing a first shroud substantially barrel-shaped defining at least partially the inner skin of the inner fixed structure;

manufacturing a second shroud substantially barrel-shaped defining at least partially the outer skin of the inner fixed structure;

manufacturing by hot forming blocks defining at least partially the inner and outer skins of the inner fixed structure;

piercing the shrouds and the blocks of said outer skin;

cutting each shroud in the longitudinal direction so as to define:

a half-shroud defining at least partially an upper outer skin;

a half-shroud defining at least partially a lower outer skin;

a half-shroud defining at least partially an upper inner skin;

a half-shroud defining at least partially a lower inner skin;

welding the blocks at the ends of each half-shroud so as to define:

an upper outer skin;

a lower outer skin;

an upper inner skin;

a lower inner skin;

assembling, for example by welding together, the blocks of the upper inner skin with the blocks of the lower inner skin so as to define the inner skin of the inner fixed structure;

depositing a brazing element on an outer wall of the lower and upper inner skins;

positioning the lower outer skin in a lower counter-form;

depositing a brazing element on an inner wall of said lower outer skin;

depositing a preformed honeycomb structure on said brazing element of the inner wall of the lower outer skin;

depositing the upper and lower inner skins on said honeycomb structure;

depositing a preformed honeycomb structure on the brazing element previously deposited on the outer wall of the upper inner skin;

depositing a brazing element on said honeycomb structure or on the inner wall of said upper outer skin;

depositing the upper outer skin on the brazing element of said honeycomb structure;

positioning an upper counter-form on the upper outer skin.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a perspective axial sectional view of a rear portion of an aircraft turbojet engine, particularly comprising an ejection cone;

FIG. 2 illustrates a longitudinal section of a tooling assembly according to the prior art for the manufacture of the front portion of the ejection cone;

FIG. 3 is a longitudinal sectional view of the tooling assembly according to the present disclosure;

FIG. 4 is a longitudinal sectional view of the core of the tooling assembly, made according to a first form;

FIG. 5 is a longitudinal sectional view of the inner skin closed at its lower and upper ends by lids;

FIG. 6 is a longitudinal sectional view of the core of the tooling assembly, made according to a second form;

Figure 7:
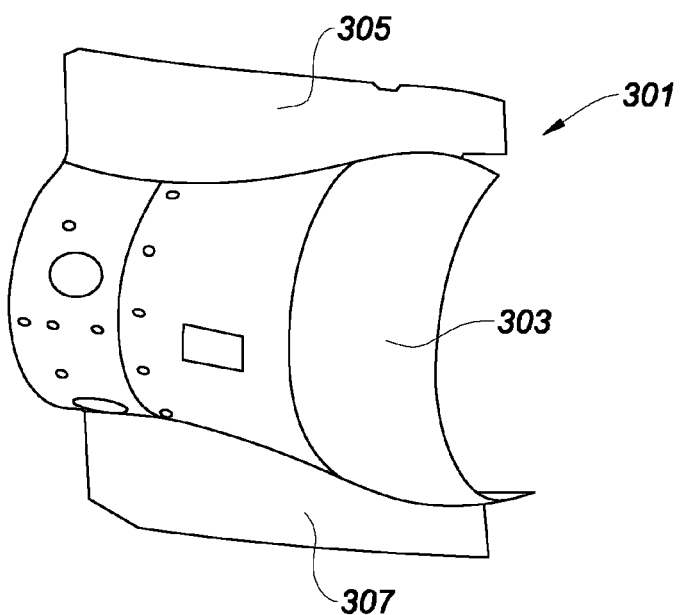

FIG. 7 schematically shows a half-shell of an inner structure of turbojet engine nacelle; and FIGS. 8 to 16 illustrate the steps of the manufacturing method according to the present disclosure applied to the manufacture of an inner fixed structure of a nacelle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 15:
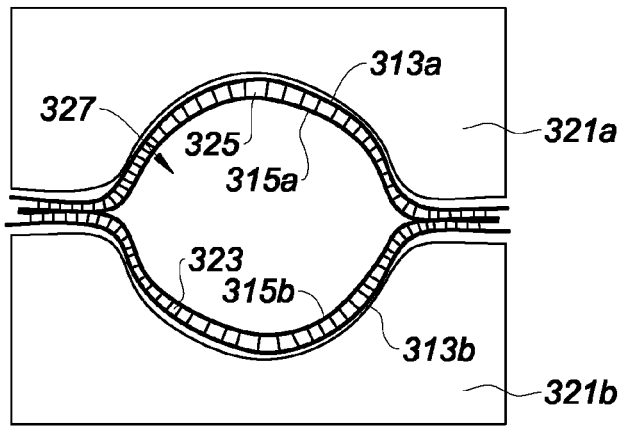

In the present description, words such as "upper" and "lower" are used with reference to the position of the tooling assembly when the latter is in position as shown for example in FIG. 3 or FIG. 15.

Referring to FIG. 3, illustrating the tooling assembly 100 shaped to implement the method for manufacturing the ejection cone of the turbojet engine.

The tooling assembly 100 comprises a counter-form 101, for example a metal, having a shape substantially similar to that desired to be given to the part to be manufactured, and a core 103 positioned inside said counter-form.

FIG. 4 shows the core 103 according to a first form.

The core 103 comprises an outer skin 105, a honeycomb structure 107 and an inner skin 109 at its lower and upper ends from which the lids 111 and 113 obstructing the core are positioned.

Typically, such lids are flasks of shape substantially similar to that of the inner skin 109 section.

These flasks are for example made of the same tight material as that of the inner and outer skins, that is to say, of Inconel 625.

It goes without saying that any other material can be used to make the tooling assembly according to the present disclosure, depending on the material of the part desired to be manufactured.

The outer skin 105 has a domed shape substantially similar to that desired to be given to the part to be manufactured, while the inner skin 109 has a substantially cylindrical shape.

The assembling method of the core 103 is made as follows.

The outer skin 105 is preformed prior to its integration into the tooling assembly, so as to give it a domed shape substantially similar to the shape of the front portion 5 of the ejection cone 1 desired to be manufactured.

The outer skin is preformed for example by a flow-turning and/or hydro-forming method, a method described in the applicant's published patent application FR2987287, which is hereby incorporated by reference in its entirety. Typically, this method consists of manufacturing a cylindrical skin by a conventional flow-turning method, then introducing said cylindrical skin in a tooling equipped with means for introducing pressurized water inside said cylindrical skin, so as to cause its displacement against a counter-form of shape substantially similar to that of the final part desired to be made. The hydro-forming method allows giving the initially cylindrical part any complex shape.

The outer skin 105 is intended to come into contact with the flow path for the circulation of the secondary air flow (said flow path is conventionally formed by the channel defined between a fairing of the turbojet engine and the inner fixed structure of the nacelle supporting the turbojet engine) when the ejection cone is integrated to the turbojet engine.

Thus, the outer skin 105 is acoustic, that is to say, it is pierced so as to allow the passage of sound waves coming from the flow path for the circulation of the secondary air flow. Such a piercing is made by a piercing method by water jet.

The honeycomb structure 107 is fixed to the inner face of the outer skin 105, for example by brazing, and fits the shape of said inner face.

A brazing sheet (not shown), for example a strip or "tape", is interposed between the outer skin 105 and the honeycomb structure 107.

The brazing sheet is for example fixed to the outer skin 105 by capacitor discharge welding or by gluing.

The honeycomb structure receives in its inner face the inner skin 109. A brazing sheet, or tape, is also interposed between the inner skin and the honeycomb structure, or glued on the outer face of the inner skin or on the outer surface of the honeycomb.

In one form, the inner skin 109 is cylindrical, but it is of course possible to provide any other form if the one skilled in the art finds a particular interest.

Furthermore, the inner skin 109 is called "full", that is to say, it is not perforated.

The core 103, comprising the outer skin 105, the honeycomb structure 107, the inner skin 109 and the brazing sheets, is now capable of being closed at its upper and lower ends by the lids 111 and 113.

The lids 111 and 113 could be welded on the inner skin 109 before the setting up of the brazing sheets.

First of all, the lower end is closed thanks to the lid 111.

As shown on FIG. 3, the assembly 100 according to the present disclosure comprises holding trays 112, 114. The tray 114 rests on a base 115 and the counter-form 101 is positioned at the periphery of the outer skin 105.

Typically, the counter-form 101 comprises two separate shells allowing the setting up and the removal of the counter-form around the core regardless of the type of the part desired to be manufactured.

The closing of the upper portion of the core 103 is then made by the lid 113, as shown on FIG. 4.

The lid 113 comprises means for introducing a gas, typically made by two supply ducts 117 communicating between the inside and the outside of the core 103.

According to the present disclosure, the lids 111 and 113 are fixed to the inner skin 109 by welding, as illustrated in FIG. 5.

Of course, the mounting and the welding of the lids 111 and 113 may either be made on the inner skin before the mounting of the honeycomb structure, the brazing sheets and the outer skin.

More specifically, it is quite possible to weld the lids 111 and 113 on the inner skin 109, then to position the honeycomb structure 107 and the outer skin 105.

The tooling assembly 100 is then clamped at the holding trays 112 and 114 for example by means of threaded rods 119 visible on FIG. 3.

Furthermore, two U-shaped rings 121 and 123 are installed at upper and lower ends of the inner skin 109, in an area of the tooling assembly where the honeycomb structure is not present.

The rings 121 and 123 allow avoiding the crushing of the inner skin on the outer skin during the introduction of the pressurized gas inside the inner skin.

Referring to FIG. 6, illustrating a core 203 of the tooling assembly made according to a second form.

The tooling assembly made according to this second form differs from the tooling assembly of the first form in that the core 203 comprises an outer skin 205 not preformed but cylindrical. The honeycomb structure 207 is also cylindrical.

According to this form, the acoustic characteristic of the outer skin 205 is for example made by a flat piercing method.

According to a non-shown alternative applying to both aforementioned forms, the core comprises an inner cask positioned inside the honeycomb and the outer skin. Such an inner cask, for example cylindrical, is equipped with gas diffusion means positioned for example on the wall of revolution of said cask or lid, allowing the communication of the gas from the inside of the cask toward the inner face of the inner skin.

The method for manufacturing a part such as a front portion of ejection cone of gases of turbojet engine is now described.

The tooling assembly is assembled according to the assembling method previously described with reference to the first or second form.

The assembled tooling assembly is placed in a vacuum furnace. The supply ducts are connected to pipes communicating with a reservoir enclosing argon or any neutral gas.

The sealing of the tooling assembly is for example checked thanks to a helium test.

Then the gas is directly introduced inside the inner face of the inner skin, under a pressure in the range of 0.6 bar. The furnace is then heated to a temperature in the range of 1040° C., corresponding to the brazing temperature of Inconel 625.

The increase in temperature causes an expansion of the gas and an increase in the pressure, up to about 6 bar.

When the furnace reaches a temperature in the range of 900° C., the pressure exerted on the inner face of the inner skin causes its displacement toward the counter-form.

The displacement of the inner skin consequently causes a plating of the honeycomb structure and of the outer skin against the inner wall of the counter-form. The brazing takes place in a temperature in the range of 1040° C.

In another form, the holding of the elements constituting the part to be manufactured is not made by brazing but by welding diffusion, that is to say by atomic diffusion between the honeycomb structure and the inner and outer skins during the thermal elevation in the furnace and the introduction of argon gas inside the inner skin.

When the manufacture of the part is complete, the inner portion of the inner skin of the manufactured part is purged, and the lids are removed from the inner skin, for example by a laser cutting method.

The thus manufactured part can be extracted from the tooling assembly after removal of the counter-form.

The present disclosure also relates to a method for manufacturing an inner structure of a turbojet engine nacelle.

An inner structure of nacelle is usually formed by two half-shells of substantially semi-cylindrical shape forming a fairing of the turbojet engine, on either side of a longitudinal vertical plane of symmetry of the nacelle.

In FIG. 7 such a half-shell 301 is illustrated, further comprising an inner skin and an outer skin, for example made of titanium.

The half-shell has a domed central portion 303 terminating by two substantially planar portions defining blocks 305, 307.

According to the present disclosure, the method for manufacturing such an inner structure comprises a step for manufacturing a deformable tight core at least in part, intended to be pressed against a counter-form defining the contour of the part to be manufactured during the implementation of the manufacturing method.

Referring now to FIGS. 8 to 16, illustrating the method according to the present disclosure applied to the manufacture of an inner structure of a turbojet engine nacelle.

A first shroud 309, substantially barrel-shaped and intended to define the domed portion of the inner skin of the inner fixed structure, is manufactured by hydro-forming.

Similarly, a second shroud, substantially barrel-shaped and intended to define the domed portion of the outer skin of the inner fixed structure, is made.

The blocks of the upper and lower half-structures of the inner and outer skins are manufactured by a hot forming method, known to the one skilled in the art.

In order to give the acoustic absorption properties to the inner fixed structure, it is particularly provided to pierce, for example by water jet, the shrouds and the blocks of the outer skin.

Figures 8, 9:
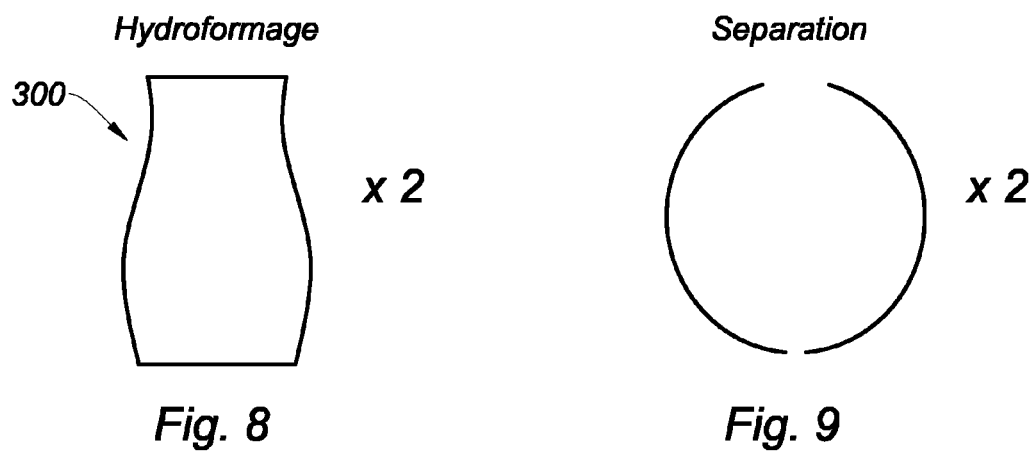

The shrouds forming the domed portion of the inner and outer skins are then cut, for example by laser cutting, as shown in FIG. 9, in the longitudinal direction, so as to dispose of four half-shrouds defining the domed portion of an upper outer skin 313*a*, a lower outer skin 313*b*, an upper inner skin 315*a* and a lower inner skin 315*b*, visible on FIG. 15.

Figure 10:
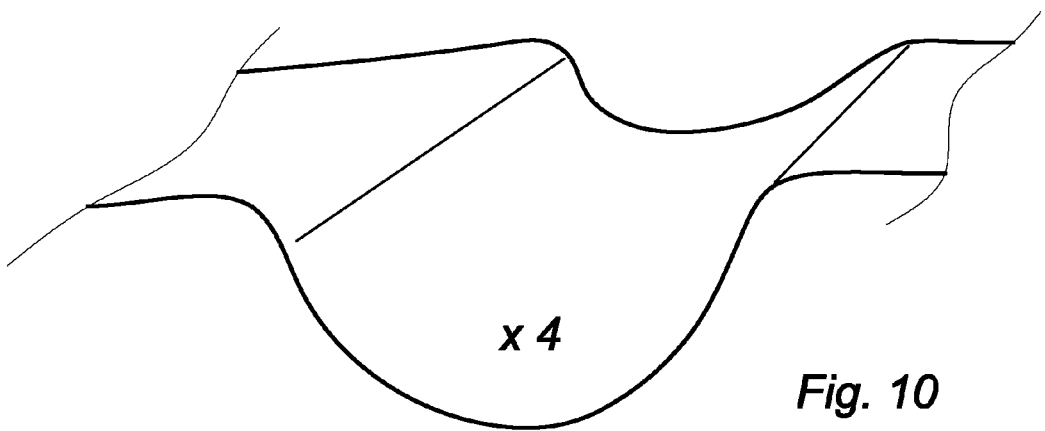

When these four elements are made, the blocks are welded at the ends of each half-shroud so as to define the upper outer skin 313*a*, the lower outer skin 313*b*, the upper inner skin 315*a* and the lower inner skin 315*b*, as shown in FIG. 10.

Figure 11:
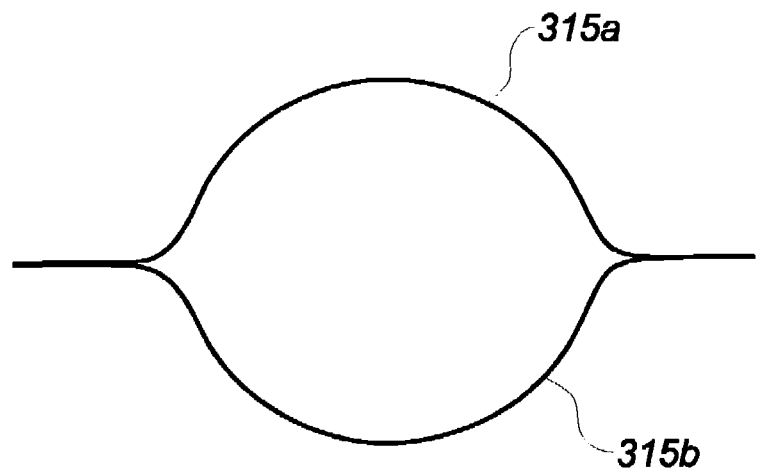

Then, by referring to FIG. 11, the blocks of the upper inner skin 315*a* are welded to the blocks of the lower inner skin 315*b* so as to define the inner skin of the inner structure of the nacelle.

Figure 12:
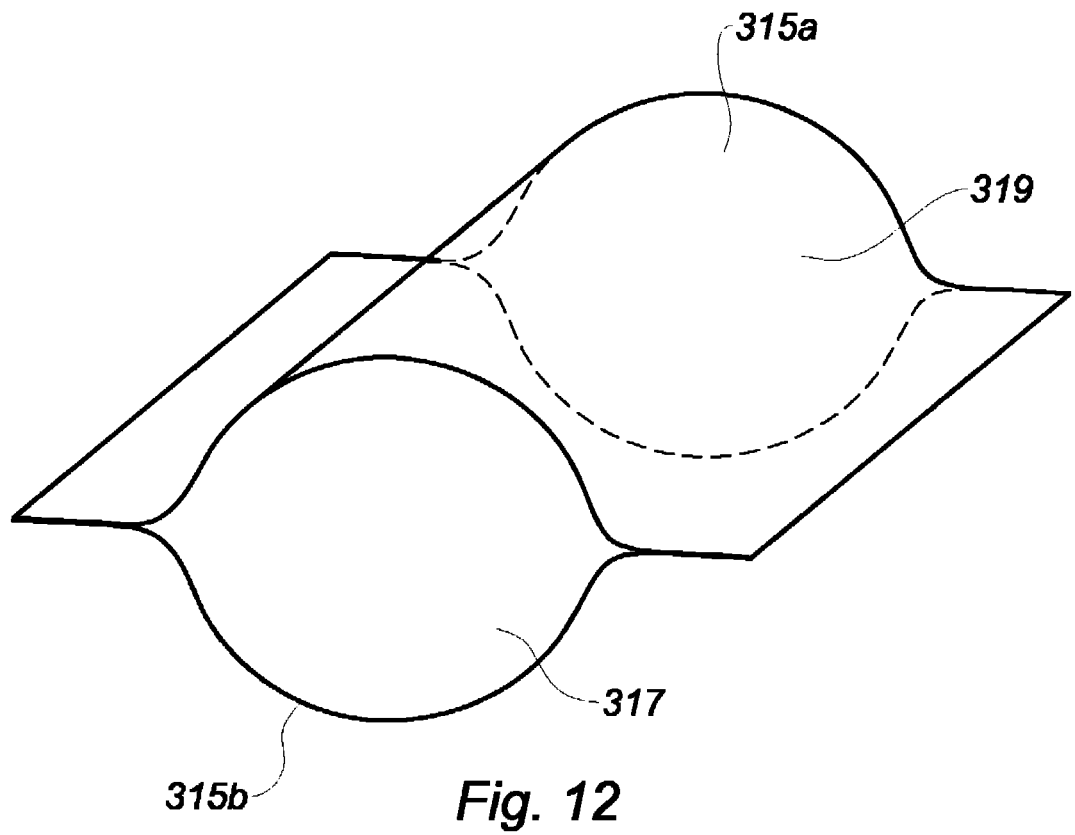
Figure 13:
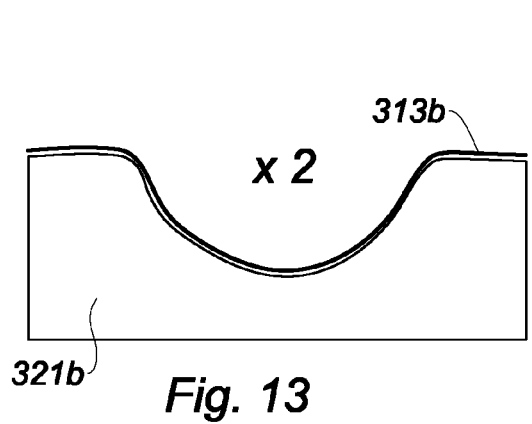

According to the present disclosure, a lid 317 and a lid 319 are welded at the open ends of the inner skins 315*a* and 315*b*, as illustrated on FIG. 12.

As above, the lids 317 and 319 are tight and comprise means for introducing a gas inside the core.

A brazing element is then deposited on the outer walls of the lower 315*b* and upper 315*a* inner skins.

The following step of the method (FIG. 13) comprises positioning the lower outer skin 313*b* in a lower counter-form 321*b*.

Figure 14:
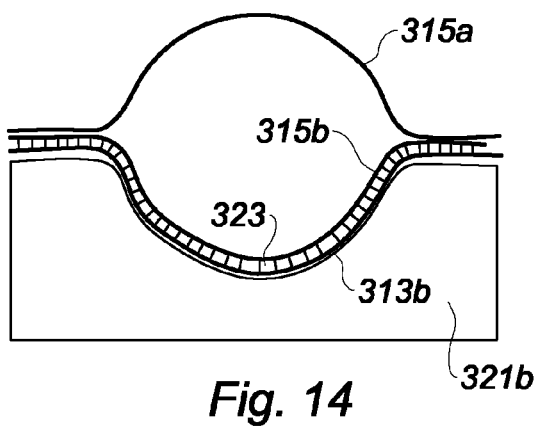

As shown on FIG. 14, a brazing element (not shown) is deposited on the inner wall of the lower outer skin 313*b*, then a preformed honeycomb structure 323 on said brazing element. The inner skin, constituted by the upper inner skin 315*a* and by the lower inner skin 315*b*, is then positioned on the honeycomb structure 323.

A preformed honeycomb structure 325 is then deposited (FIG. 15) on the brazing element (not shown) previously deposited on the outer wall of the upper inner skin 315*a*.

A brazing element (not shown) is then added on the honeycomb structure 325 before depositing the upper outer skin 313*a* on the brazing element of said honeycomb structure. The brazing element may alternately be deposited not on the honeycomb structure but directly on the inner wall of the upper outer skin.

An upper counter-form 321*a* is then placed in contact with the upper outer skin 313*a*.

The lower 321*b* and upper 321*a* counter-forms are for example made of carbon-carbon composite material, which allows avoiding excessive thermal inertia related to the dimensions of the part to be manufactured.

The core 327 then comprises inner 315*a*, 315*b* and outer 313*a*, 313*b* skins separated by the honeycomb structures 323, 325 and by the brazing elements.

Figure 16:
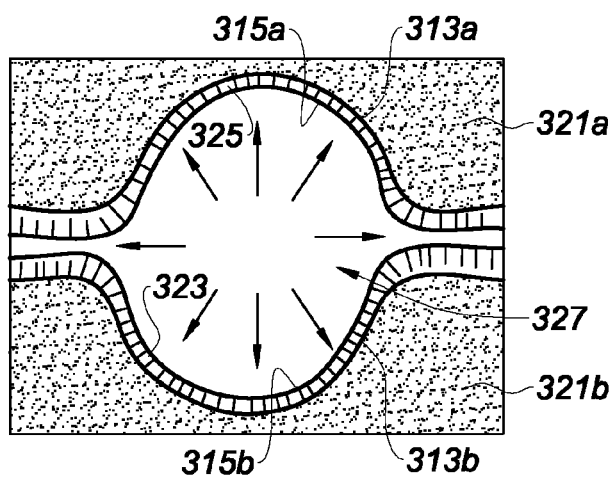

The tooling assembly, comprising the core 327 closed thanks to the lids and by the counter-forms 321*a* and 321*b*, is then vertically placed in a vacuum furnace, as it is schematically illustrated on FIG. 16.

Then a pressurized gas, for example argon, is introduced directly inside the inner skin of the core of the tooling assembly, defined by the upper inner skins 315*a* and 315*b*.

By heating the tooling assembly up to the brazing temperature, are caused successively:

the plating of the core 327 against the upper 321*a* and lower 321*b* counter-forms, by gas expansion;

the brazing of the honeycomb structures 323, 325 and of the inner 315*a*, 315*b* and outer 313*a*, 313*b* skins.

When the brazing operation is complete, the gas is then purged from the core, and the tooling assembly is dismounted so as to extract the manufactured part.

Thanks to the tooling assembly used to implement the method according to the present disclosure, we get rid of the presence of a central cask enclosing the pressurized gas to be diffused according to the prior art.

In this way the mass of the tooling assembly relative to the toolings known from the prior art is significantly reduced.

Consequently, the thermal inertia is reduced, which allows reducing the thermal cycle and the duration of manufacture of a metal part.

Finally, as it goes without saying, the present disclosure is not limited to the sole forms of the tooling assembly, described above as examples, but it encompasses all the alternatives.

What is claimed is:

1. A manufacturing method for a metal part comprising:
positioning a tooling assembly without a central cask in a vacuum furnace, the tooling assembly comprising:
at least one counter-form with a shape substantially similar to a shape of said metal part to be manufactured; and
at least one core deformable at least partially; wherein said at least one core comprises:
at least one inner skin and at least one outer skin, said inner and outer skins constituting corresponding inner skin and outer skins of said metal part to be manufactured;
at least one honeycomb structure positioned between said at least one inner and outer skins; and
at least one brazing element interposed between said at least one honeycomb structure and said at least one inner skin, and between said honeycomb structure and said at least one outer skin, said at least one core being closed at ends by at least one lid comprising means for introducing a gas within said core, at least one of said lids being fixed to said at least one inner skin by welding,
introducing a pressurized gas through the at least one lid and directly inside said at least one inner skin of said at least one core of the tooling assembly;
heating the tooling assembly so as to cause successively:
the plating of said at least one core against said at least one counter-form by expansion of said pressurized gas; and brazing said at least one honeycomb structure and said at least one inner and outer skins;
purging said pressurized gas from an inner portion of said at least one inner skin;
dismounting the tooling assembly so as to extract said metal part manufactured; and removing the at least one lid from the at least one inner skin.

2. The manufacturing method according to claim 1, wherein said metal part to be manufactured is a front portion of an ejection cone of hot gases discharged by an aircraft turbojet engine.

3. The manufacturing method according to claim 2, said at least one inner and outer skins are made of austenitic nickel-chromium based superalloys.

4. The manufacturing method according to claim 2, wherein said at least one inner skin is formed by hydroforming.

5. The manufacturing method according to claim 2, wherein said at least one inner skin is substantially cylindrical in shape.

6. The manufacturing method according to claim 2, wherein said at least one outer skin is preformed.

7. The manufacturing method according to claim 2, wherein said at least one outer skin is substantially cylindrical in shape.

8. The manufacturing method according to claim 1, wherein said at least one outer skin is an acoustic skin.

9. The manufacturing method according to claim 1, wherein said metal part to be manufactured is an inner fixed structure of a turbojet engine nacelle whose inner and outer skins are made of titanium.

10. The manufacturing method according to claim 8, wherein the tooling assembly is made by a manufacturing method comprising the following steps:
   manufacturing a first substantially barrel-shaped shroud defining at least partially the inner skin of the inner fixed structure;
   manufacturing a second substantially barrel-shaped shroud defining at least partially the outer skin of the inner fixed structure;
   manufacturing blocks by hot forming, said blocks defining at least partially the inner and outer skins of the inner fixed structure;
   piercing the first and second barrel-shaped shrouds and said blocks of the outer skin of the inner fixed structure;
   cutting each of the first and second barrel-shaped shrouds in the longitudinal direction so as to define:
   a half-shroud defining at least partially an upper outer skin;
   a half-shroud defining at least partially a lower outer skin;
   a half-shroud defining at least partially an upper inner skin;
   a half-shroud defining at least partially a lower inner skin;
   welding the blocks to ends of each of the half-shrouds so as to define:
   an upper outer skin;
   a lower outer skin;
   an upper inner skin;
   a lower inner skin,
   assembling the blocks of the upper inner skin with the blocks of the lower inner skin so as to define the inner skin of the inner fixed structure;
   depositing a brazing element on an outer wall of the lower and upper inner skins;
   positioning the lower outer skin on a lower counter-form;
   depositing a brazing element on an inner wall of the lower outer skin;
   depositing a lower preformed honeycomb structure on the brazing element of the inner wall of the lower outer skin;
   depositing the lower and upper inner skins on the lower preformed honeycomb structure; and
   depositing an upper preformed honeycomb structure on the brazing element previously deposited on the outer wall of the upper inner skin;
   depositing a brazing element on the upper preformed honeycomb structure or on the inner wall of said upper outer skin;
   depositing the upper outer skin on the brazing element of the upper honeycomb structure; and
   positioning an upper counter-form on the upper outer skin.

* * * * *